(12) United States Patent
Ochiai et al.

(10) Patent No.: US 7,813,849 B2
(45) Date of Patent: Oct. 12, 2010

(54) VEHICLE CONTROL SYSTEM

(75) Inventors: Kiyoe Ochiai, Nagoya (JP); Takehiro Koga, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/458,824

(22) Filed: Jul. 23, 2009

(65) Prior Publication Data
US 2010/0070121 A1 Mar. 18, 2010

(30) Foreign Application Priority Data
Sep. 16, 2008 (JP) .............................. 2008-236871

(51) Int. Cl.
*G06F 19/00* (2006.01)
(52) U.S. Cl. ............................... 701/22; 701/1; 701/29; 701/34
(58) Field of Classification Search .................... 701/22, 701/1, 29, 34, 35; 60/601; 123/497, 697; 713/1
See application file for complete search history.

(56) References Cited

U.S. PATENT DOCUMENTS

| | | | |
|---|---|---|---|
| 7,418,957 B2 * | 9/2008 | Abe | 123/697 |
| 7,475,234 B2 * | 1/2009 | Suzuki | 713/1 |
| 2006/0277907 A1 * | 12/2006 | Ueda et al. | 60/601 |
| 2007/0175454 A1 * | 8/2007 | Shimazaki et al. | 123/497 |

FOREIGN PATENT DOCUMENTS

| | | |
|---|---|---|
| EP | 1 245 812 A2 | 10/2002 |
| JP | A-2002-295300 | 10/2002 |
| JP | A-2004-166341 | 6/2004 |
| JP | A 2006-348778 | 12/2006 |
| JP | A-2007-187138 | 7/2007 |
| JP | A 2008-199769 | 8/2008 |

OTHER PUBLICATIONS

Dec. 1, 2009 Office Action issued in Japanese Patent Application No. 2008-236871 (with translation).

* cited by examiner

*Primary Examiner*—Tan Q Nguyen
(74) *Attorney, Agent, or Firm*—Oliff & Berridge, PLC

(57) ABSTRACT

In a vehicle control system, an opportunity for detecting abnormalities in an atmospheric pressure sensor using an intake pressure sensor of the engine is appropriately provided. A vehicle control system 10 includes an engine 12, rotating electric machines 14 and 16, a power supply circuit 18, an intake pressure sensor 20, an atmospheric pressure sensor 22, an IG-ON/OFF switch 70, and a control device 48. A control unit 50 of the control device 48 includes a system start/stop module 52 which starts and stops operation of the entire system, a sensor state determination module 54 which determines whether the atmospheric pressure sensor 22 is in an abnormal state based on a detection value of the intake pressure sensor 20, a boosting limit module 56 which limits the boosting voltage of the voltage converter 34 corresponding to a detection value of the atmospheric pressure sensor 22, and a power supply stop delaying module 58 which delays a stop of electric power supply from a low-voltage battery 44 for a predetermined period after the engine stopped.

9 Claims, 5 Drawing Sheets

VEHICLE CONTROL SYSTEM

PRIORITY INFORMATION

This application claims priority to Japanese Patent Application No. 2008-236871, filed on Sep. 16, 2008, the entire content of which is incorporated herein by reference.

FIELD OF THE INVENTION

The present invention generally relates to a vehicle control system, and more particularly to a vehicle control system for controlling a vehicle including an engine, a rotating electrical machine, and a boosting circuit.

BACKGROUND OF THE INVENTION

When a vehicle having a rotating electric machine is traveling at a high altitude, the insulating properties of the rotating electric machine and a power supply circuit, operating with a high voltage, are degraded due to a drop in the atmospheric pressure. In such situation, a boosting voltage supplied to the rotating electric machine may be limited. In order to limit the boosting voltage, an atmospheric pressure sensor is used as means for detecting the atmospheric pressure. The atmospheric pressure sensor is monitored for abnormalities, because if an abnormality is caused in the atmospheric pressure sensor, the boosting voltage will not be controlled accurately.

For example, JP 2004-166341 A discloses an abnormality detection device for pressure sensors, in which abnormalities in an intake pressure sensor and an atmospheric pressure sensor, which are two pressure sensors involved in engine operation, are detected based on presence or absence of a deviation between the detection values of the two pressure sensors at the time when the engine has not been started before cranking-up so that the detection values of the two pressure sensors must be almost the same.

As described in JP 2004-166341 A, if abnormalities in the atmospheric pressure sensor are detected using the intake pressure sensor of the engine, there is no need to provide a particular sensor for monitoring abnormalities in the atmospheric pressure sensor. In order to determine abnormalities in the atmospheric pressure sensor using the intake pressure sensor of the engine, JP 2004-166341 A describes that a feature that an intake pressure of the engine returns to the atmospheric pressure when the engine stops is utilized. This means that abnormalities in the atmospheric pressure sensor can be detected by the intake pressure sensor only when the engine has stopped. Therefore, in some cases, the vehicle may travel for a long time without having an opportunity to detect abnormalities in the atmospheric pressure sensor.

SUMMARY OF THE INVENTION

An object of the present invention is to provide a vehicle control system capable of appropriately providing opportunities for detecting abnormalities in an atmospheric pressure sensor.

A vehicle control system according to the present invention includes a boosting circuit that supplies a boosting voltage to a rotating electric machine, a boosting voltage setting unit that sets a value of the boosting voltage of the boosting circuit according to a detection result of an atmospheric pressure sensor, an abnormality diagnosis unit that performs diagnosis of an abnormality on the atmospheric pressure sensor or an engine intake pressure sensor based on a comparison between a value detected by an engine intake pressure sensor and a value detected by the atmospheric pressure sensor when an engine has stopped, a circuit unit power supply that supplies operational electric power to the abnormality diagnosis unit, and a power supply stop delaying unit that delays a stop of the circuit unit power supply until an atmospheric pressure return period, during which a pressure of the engine intake pressure sensor returns to the atmospheric pressure, has elapsed.

In the vehicle control system according to the present invention, it is preferable that the abnormality diagnosis unit immediately performs diagnosis of an abnormality on the atmospheric pressure sensor or the engine intake pressure sensor when the operational electric power is again supplied from the circuit unit power supply after a stop of the circuit unit power supply has been delayed until the atmospheric pressure return period has elapsed.

In the vehicle control system according to the present invention, it is preferable that the boosting voltage setting unit sets a value of the boosting voltage of the boosting circuit based on the result of the abnormality diagnosis.

In the vehicle control system according to the present invention, it is preferable that the boosting voltage setting unit sets a value of the boosting voltage of the boosting circuit to the safe side when the atmospheric pressure sensor or the engine intake pressure sensor is diagnosed as abnormal as a result of the abnormality diagnosis, and the set value remains until the atmospheric pressure sensor or the engine intake pressure sensor is diagnosed as normal as a result of the next abnormality diagnosis.

In the vehicle control system according to the present invention, it is preferable that the vehicle control system includes an start/stop unit that commands a start and a stop of the entire system including the engine and the rotating electric machine, and a return period storing unit that stores the atmospheric pressure return period beforehand as a characteristic relating to the engine intake pressure sensor, and the abnormality diagnosis unit compares a period of time from a previous system stop command until a present system start command and the atmospheric pressure return period, and when the former is longer than the latter, the abnormality diagnosis unit performs a diagnosis of an abnormality on the atmospheric pressure sensor and the engine intake pressure sensor immediately after the present system start.

In the vehicle control system according to the present invention, it is preferable that when the next system start command is input during the period in which a stop of the circuit unit power supply has been delayed, a system starting process including a determination of whether to start the engine is given priority.

In the vehicle control system according to the present invention, it is preferable that the abnormality diagnosis unit diagnoses that the atmospheric pressure sensor or the engine intake pressure sensor is abnormal when a state, where a deviation between an air pressure value detected by the atmospheric pressure sensor and an air pressure value detected by the engine intake pressure sensor is larger than a predetermined deviation, continues for a second predetermined period after a first predetermined period has elapsed from the time when the engine stopped.

In the vehicle control system according to the present invention, it is preferable that when a time change of an air pressure value detected by the engine intake pressure sensor, immediately after the system start command, is larger than a predetermined rate of change, the abnormality diagnosis unit determines that it is not necessary to perform a diagnosis of an abnormality on the atmospheric pressure sensor and the engine intake pressure sensor, based on an assumption that the present system start command was input following the previous system stop command.

In the vehicle control system according to the present invention, it is preferable that when the abnormality diagnosis unit diagnoses that the atmospheric pressure sensor or the engine intake pressure sensor is abnormal, the abnormality diagnosis unit causes the boosting voltage setting unit to set the boosting voltage to a predetermined lower limit voltage.

In the vehicle control system according to the present invention, it is preferable that the vehicle control system further includes an abnormality storing unit that stores a sensor abnormality when the atmospheric pressure sensor or the engine intake pressure sensor was diagnosed as abnormal at the time of previous system stop and the boosting voltage was set to a predetermined lower limit voltage, and the abnormality diagnosis unit causes the boosting voltage setting unit to maintain the boosting voltage at the predetermined lower limit voltage at the time of present system start when the abnormality storing unit stores the sensor abnormality.

With the above configuration, the vehicle control system delays a stop of the circuit unit power supply, which supplies operational electric power to the abnormality diagnosis unit for diagnosing abnormalities in the atmospheric pressure sensor or in the engine intake pressure sensor, until the atmospheric pressure return period during which the air pressure of the engine intake pressure sensor returns to the atmospheric pressure has elapsed. Thereby, an opportunity to reliably acquire a detection value of the engine intake pressure sensor can be secured. Accordingly, an opportunity for detecting an abnormality in the atmospheric pressure sensor can be obtained appropriately.

Further, in the vehicle control system, as a diagnosis of an abnormality in the atmospheric pressure sensor or the engine intake pressure sensor is performed immediately after a stop of the circuit unit power supply has been delayed until the atmospheric pressure return period has elapsed and then the operational electric power is supplied again from the circuit unit power supply, an opportunity for detecting an abnormality in the atmospheric pressure sensor can be reliably obtained when the operational electric power is supplied again from the circuit unit power supply.

Further, in the vehicle control system, as a value of the boosting voltage of the boosting circuit is set based on the result of an abnormality diagnosis, the boosting voltage can be set so as to sufficiently secure insulating properties of the rotating electric machine and the like when the atmospheric pressure drops.

Further, in the vehicle control system, a value of the boosting voltage of the boosting circuit is set to the safe side when the atmospheric pressure sensor or the engine intake pressure sensor is diagnosed as abnormal as a result of an abnormality diagnosis, and the set value remains until the atmospheric pressure sensor or the engine intake pressure sensor is diagnosed as normal as a result of the next abnormality diagnosis. This provides a fail safe for securing sufficient insulating properties of the rotating electric machine and the like even if the atmospheric pressure drops.

Further, in the vehicle control system, the atmospheric pressure return period is stored beforehand as a characteristic relating to the engine intake pressure sensor, and a period of time from the previous system stop command until the present system start command and the atmospheric pressure return period are compared, and when the former is longer than the latter, a diagnosis of an abnormality in the atmospheric pressure sensor and the engine intake pressure sensor is performed. With this configuration, as a sufficient time for the air pressure of the engine intake pressure sensor to return to the atmospheric pressure is provided, an opportunity for detecting an abnormality in the atmospheric pressure can be obtained immediately after the system start.

Further, in the vehicle control system, when the next system start command is input while the stop of the circuit unit power supply is delayed, by giving priority to the system starting process including a determination of whether to start the engine, travel of the vehicle can be less affected.

Further, in the vehicle control system, as the abnormality diagnosis unit diagnoses that the atmospheric pressure sensor or the engine intake pressure sensor is abnormal when a state, where a deviation between an air pressure value detected by the atmospheric pressure sensor and an air pressure value detected by the engine pressure sensor is larger than a predetermined deviation, continues for a second predetermined period after a first predetermined period has elapsed from the time when the engine stopped. Thereby, abnormalities in the atmospheric pressure sensor or the like can be diagnosed appropriately without any special sensors.

In the vehicle control system, when a time change of an air pressure value detected by the engine intake pressure sensor immediately after the system start command is larger than a predetermined rate of change, the abnormality diagnosis unit determines that it is not necessary to diagnose an abnormality in the atmospheric pressure sensor and the engine intake pressure sensor, based on an assumption that the present system start command was input following the previous system stop command. In general, a period of time in which the air pressure of the intake path of the engine returns to the atmospheric pressure after the engine stop is less than one minute, and is often several seconds, for example. Therefore, in the case of typical vehicle operation, a period from a system stop command until the next system start command must be sufficiently longer than the period in which the air pressure of the engine intake pressure sensor returns to the atmospheric pressure.

It should be noted that the case where the time change in the air pressure value, detected by the engine intake pressure sensor immediately after the system start command, is larger than a predetermined rate of change occurs when the next system start command is input by a user while the air pressure of the engine intake pressure sensor has not returned to the atmospheric pressure, unlike the typical vehicle operation. This is an exceptional case, and as there is a high possibility that another opportunity for performing an abnormality diagnosis on the atmospheric pressure sensor may be provided later, it is unlikely that a problem will be caused even though an opportunity for performing an abnormality diagnosis is not provided at this point.

Further, in the vehicle control system, when the abnormality diagnosis unit diagnoses that the atmospheric pressure sensor or the engine intake pressure sensor is abnormal, the abnormality diagnosis unit causes the boosting voltage setting unit to set the boosting voltage to a predetermined lower limit voltage. This provides a fail safe for sufficiently securing insulating properties of the rotating electric machine even if the atmospheric pressure drops.

Further, in the vehicle control system, when the atmospheric pressure sensor or the engine intake pressure sensor was diagnosed as abnormal at the time of a previous system stop and the boosting voltage has been set to a predetermined lower limit voltage, the abnormal state of the sensor is stored, and in that case, the boosting voltage setting unit is caused to maintain the boosting voltage at the predetermined lower limit voltage at the time of present system start. This also provides a fail safe for sufficiently securing insulating properties of the rotating electric machine and the like even if the air pressure drops.

DETAILED DESCRIPTION OF THE EMBODIMENTS

Figure 1:
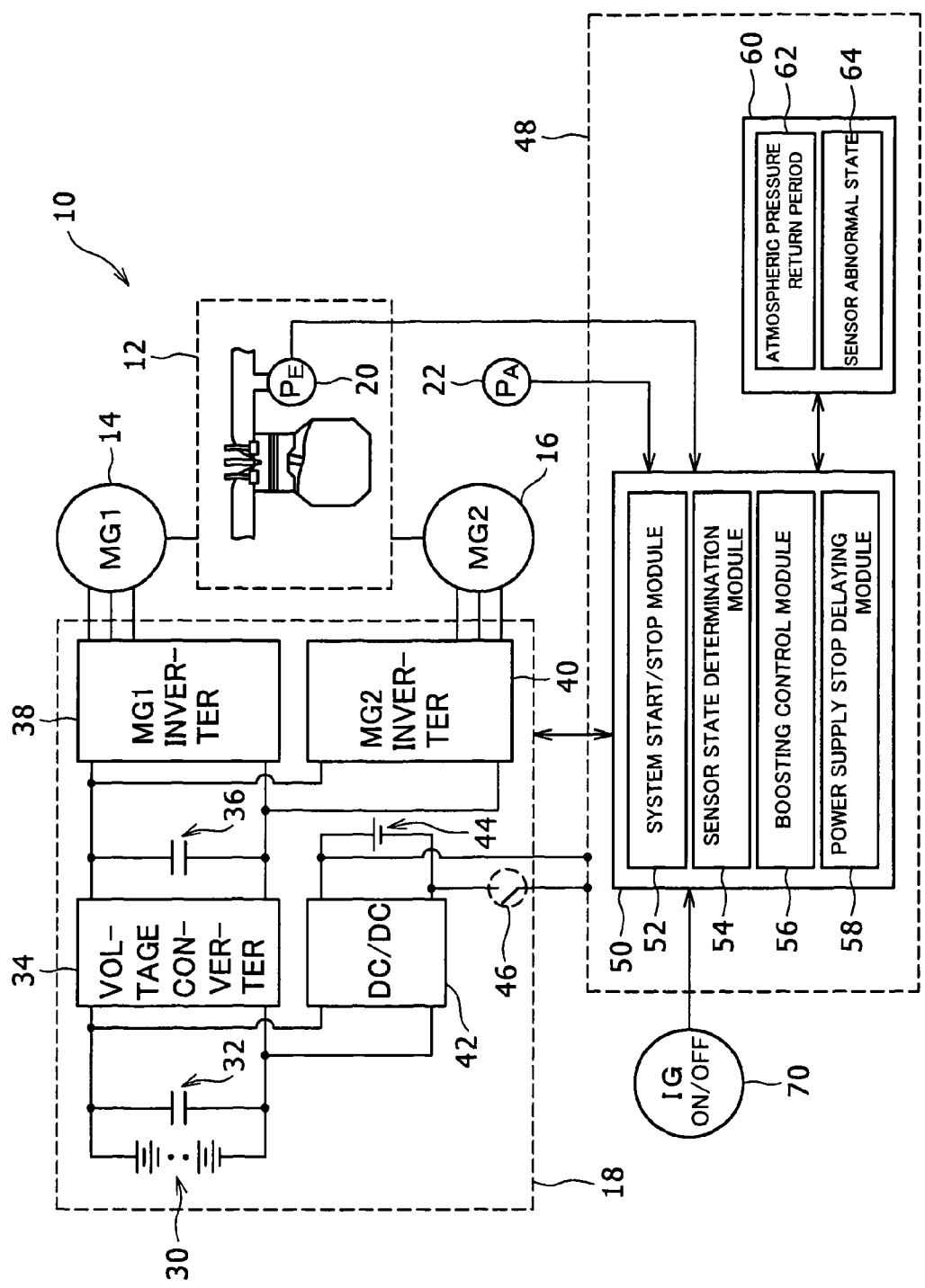
FIG. 1 is a diagram illustrating the configuration of a vehicle control system of one embodiment according to the present invention.

An embodiment of the present invention will be described below in detail with making reference to the drawings. Although description given below is based on the premise that two motor generators, both having a motor function and a power generating function, are used as rotating electric machines connected to a power supply device, this configuration may be modified to include one rotating electric machine only having a motor function and another rotating electric machine only having a power generating function. Further, it is also acceptable to use a single motor generator. While a power supply circuit connected to the rotating electric machines includes an electrical storage device, a voltage converter, a smoothing capacitor, an inverter, a DC/DC converter, a low-voltage battery, and a main relay in the description below, any appropriate elements other than these may be added.

Hereinafter, like elements are denoted by like reference numerals in all drawings, and the description is not repeated. Further, in the description herein, previously described reference numerals will be used, if necessary.

FIG. 1 is a diagram illustrating the configuration of a vehicle control system 10. The vehicle control system 10 includes an engine 12 and two rotating electric machines 14 and 16 working as a drive source of a hybrid vehicle, a power supply circuit 18 connected to the rotating electric machines 14 and 16, an intake pressure sensor 20 of the engine 12, an atmospheric pressure sensor 22, an IG-ON/OFF switch 70 which detects operations by a user to start and stop the entire system and outputs signals, and a control device 48. The control device 48 includes a control unit 50 which performs arithmetic processing and the like, and a storage unit 60 which stores programs and the like. Although this vehicle control system 10 has a function of controlling operation of the hybrid vehicle, in this embodiment, the vehicle control system 10 particularly has a function of adequately acquiring opportunities for detecting abnormalities in the atmospheric pressure sensor.

The engine 12 is an internal combustion engine constituting, together with the rotating electric machines 14 and 16, the drive source of the vehicle. The engine 12 has a function of driving the wheel shaft of the vehicle and rotating the wheels to allow the vehicle to travel, and also a function of using the rotating electric machines 14 and 16 as electric power generators to cause them to generate electric power and charging the electrical storage device 30 included in the power supply circuit 18. Control of the engine 12 is performed by the controller 50 via an engine ECU (Electronic Control Unit) not shown.

The intake pressure sensor 20 provided on the engine 12 is connected to an exhaust pipe of the engine 12 and has a function of detecting the pressure inside the exhaust pipe. A detection value of the intake pressure sensor 20 is transmitted to the control unit 50 through an appropriate signal line. The detection value of the intake pressure sensor 20 is also used to set operating conditions of the engine 12. Further, as the air pressure inside the exhaust pipe of the engine 12 returns to the atmospheric pressure when a certain time has elapsed since the operation of the engine 12 stopped, with this property, the intake pressure sensor 20 is used for detecting abnormalities in the atmospheric pressure sensor 22.

As an atmospheric pressure return time $T_R$ required from a stop of operation of the engine 12 until the air pressure inside the exhaust pipe returns to the atmospheric pressure depends on the structure of the engine 12, if the engine 12 is decided, it is possible to acquire the atmospheric pressure return period $T_R$ beforehand through experiments or the like. Accordingly, when a state, where a deviation between an air pressure value detected by the atmospheric pressure sensor 22 and an air pressure value detected by the intake air pressure sensor 20 is larger than a predetermined deviation after the atmospheric pressure return period acquired beforehand has elapsed following the engine stop, continues for a predetermined time period, it can be determined that the atmospheric pressure sensor 22 or the engine intake pressure sensor 20 is abnormal.

The atmospheric pressure sensor 22 is arranged at an appropriate position in the vehicle, and has a function of detecting the atmospheric pressure. A detection value of the atmospheric pressure sensor is transmitted to the control unit 50 through an appropriate signal line. The detection value of the atmospheric pressure sensor is used for setting operational conditions of the engine and, in this embodiment, is also used for setting a boosting voltage of the voltage converter 34 in the power supply circuit 18 in order to cope with deterioration of the insulating properties of the rotating electric machines 14 and 16 and the power supply circuit 18 corresponding to the low atmospheric pressure. The atmospheric pressure sensor 22 is arranged at an appropriate position in the vehicle, that is, inside an inverter case for accommodating two inverters, for example.

The rotating electric machines 14 and 16 are motor generators (MG) mounted in the vehicle, and are three-phase synchronous-type rotating electric machines which function as motors when electric power is supplied from the electrical storage device 30, and function as electric power generators when breaking. The rotating electric machines 14 and 16 also function as electric power generators when being driven by the engine 12 as described above.

While the rotating electric machines 14 and 16 can be used without distinguishing them, they can be used such that one of the rotating electric machines 14 and 16 is used as an electric power generator for charging the electrical storage device 30, and the other one is mainly used as a motor for travel of the vehicle. That is, it is acceptable for one rotating electric machine (MG1) 14 to be driven by the engine 12 so as to be used as an electric power generator, and supplies the generated electric power to the electrical storage device 30 via the power supply circuit 18, and for the other rotating electric machine (MG2) 16 to be used for travel of the vehicle, and at the time of power running, the other rotating electric machine (MG2) 16 functions as a motor by receiving electric power supplied from the electrical storage device 30, while at the time of braking, it functions as an electric power generator so as to collect the regenerative energy and charges the electrical storage device 30 via the power supply circuit 18. Control of the rotating electric machines 14 and 16 is performed by the control unit 50 via an MG-ECU not shown.

The power supply circuit 18 includes the electrical storage device 30, a smoothing capacitor 32 on the electrical storage device side, a voltage converter 34, a smoothing capacitor 36 on the inverter side, two inverters including an MG1 inverter 38 and an MG2 inverter 40, a DC/DC converter 42, a low-voltage battery 44, and an ECU main relay 46 provided between the control unit 50 and the low-voltage battery 44.

The electrical storage device 30 is a chargeable/dischargeable secondary battery for high voltage. As the electrical storage device 30, a lithium-ion assembled battery or a nickel-hydride assembled battery having a terminal voltage of about 200 V, or a capacitor may be used, for example.

The voltage converter 34 is provided between the electrical storage device 30 and the two inverters, and is a circuit having a voltage converting function. The voltage converter 34 can be configured to include a reactor, a switching element and the like, the switching element being operable under the control of the control unit 50. The voltage converter 34 has a boosting function of boosting the voltage of the electrical storage device side utilizing the energy cumulative action of the reactor and supplying it to the inverter side, and a function of stepping down the voltage of the electric power from the inverter side and supplies it to the electrical storage device side as charging power. When attention is given to the boosting function, the voltage converter 43 may be termed a boosting circuit.

The smoothing capacitor 32 on the electrical storage device side, provided between the electrical storage device 30 and the voltage converter 34, has a function of suppressing and smoothing fluctuations of voltage and electric current between the electrical storage device 30 and the voltage converter 34.

Both the MG1 inverter 38 and the MG2 inverter 40 are circuits for performing electric power conversion between AC power and DC power. Each of the inverters 38 and 40 includes a plurality of switching elements operable under the control of the control unit 50. In the above example, when the rotating electric machine (MG1) 14 is caused to function as an electric power generator, the MG1 inverter 38 has a function of AC/DC converting function of converting the AC three-phase regenerative power from the rotating electric machine (MG1) into DC power, and supplying the power to the electrical storage device side as charging current. Further, The MG2 inverter 40 has a DC/AC converting function of converting DC power from the electrical storage device side into AC three-phase drive power and supplying the power to the rotating electric machine (MG2) as driving power when the vehicle is in a power running state, and when the vehicle is in a braking state, an AC/DC converting function of converting the AC three-phase regenerative power from the rotating electric machine (MG2) 16 into DC power and supplying it to the electrical storage device side as charging current.

As described above, the smoothing capacitor 36 on the inverter side, provided between the voltage converter 34 and a set of a positive-electrode bus and a negative-electrode bus commonly connected to the two inverters, has a function of suppressing and smoothing fluctuation of voltage and electric current between the set of the positive-electrode bus and the negative-electrode bus.

The DC/DC converter 42, arranged in parallel with the positive-electrode bus and the negative-electrode bus on the electrical storage device 30 side with respect to the voltage converter 34, is a voltage converter circuit which converts the high-voltage power of the electrical storage device 30 which is a high-voltage secondary battery into low-voltage power, and supplies the power to the low-voltage battery 44. In this way, as the DC/DC converter 42 has a voltage stepping-down function, in some cases, the DC/DC converter 42 may have a boosting function of boosting the low-voltage power of the low-voltage battery 44 and supplying the power to the electrical storage device 30 side of the voltage converter 34.

The low-voltage battery 44 is a chargeable/dischargeable low-voltage electrical storage device, having a function as a circuit unit power supply for supplying operating power to various ECUs including the engine ECU, the MG-ECU, and the control device 48. As the low-voltage battery 44, a lead storage battery having a terminal voltage of about 12V to 14V can be used.

The ECU main relay 46 is a relay having a switching function of supplying electric power to the various ECUs including the control device 48 or stopping the power supply.

The IG-ON/OFF switch 70 is a switching operation element which detects operations by a user to start or stop the entire system and outputs signals to the control device 48.

The control device 48 includes the control unit 50 which performs arithmetic processing and the like as described above, and a storage unit 60 which stores programs and the like. As the control device 48, a control circuit suitable for being mounted on a vehicle can be used, and also, a computer suitable for being mounted on a vehicle can be used.

The storage unit 60 stores, in addition to the programs, an atmospheric pressure return period storing file 62 which memorizes an atmospheric pressure return period $T_R$ required for a detection value of the intake pressure sensor 20 returning from the intake pressure to the atmospheric pressure when the engine 12 stops, and a sensor abnormal state storing file 64 which memorizes that the atmospheric pressure sensor 22 is determined to be in an abnormal state and thereby the boosting voltage of the voltage converter 34 is set to a lower limit voltage, particularly in this embodiment. As the storage unit 60, a semiconductor memory having an appropriate storage capacity, such as an SRAM for example, may be used. As the storage unit 60, a memory built in the computer or an independent memory may be used.

The control unit 50 has a function of comprehensively controlling operations of the respective elements, and has a function of controlling operations of the engine 12 and the rotating electric machines 14 and 16 via the engine ECU and the MG-ECU, as described above. Further, although the control unit 50 also has a function of controlling the boosting voltage of the voltage converter 34 in accordance with a detection result of the atmospheric pressure sensor 22, in this embodiment, the control unit 50 particularly has a function to appropriately acquire opportunities for detecting an abnormality in the atmospheric pressure sensor 22. As the control unit 50, a CPU of the computer can be used.

As the functions of the control unit 50, the control unit 50 includes a system start/stop module 52 which acquires a signal output from the IG-ON/OFF switch 70 and starts or stops operation of the entire system, a sensor state determination module 54 which determines whether the atmospheric pressure sensor 22 or the intake pressure sensor 20 is in an abnormal state based on the detection value of the intake pressure sensor 20 of the engine 12, a boosting limit module 56 which performs boosting voltage settings for limiting the boosting voltage of the voltage converter 34 in accordance with the detection value of the atmospheric pressure sensor 22, and a power supply stop delaying module 58 which delays stopping of electric power supply from the low-voltage battery 44 for a predetermined time after engine stop.

These functions can be realized by software, and specifically, these functions can be realized by executing an atmospheric pressure sensor abnormality diagnosis program in the vehicle control program. Some of such functions may be realized by hardware.

Actions of the above configuration, in particular, various functions of the control unit 50, will be described in detail below.

In order to detect an abnormality in the atmospheric pressure sensor 22 using the intake pressure sensor 20 of the engine 12, a certain period during which the engine 12 has stopped is necessary. If the vehicle keeps traveling by the engine 12, it is hard to have an opportunity to detect an abnormality in the atmospheric pressure sensor 22. According to the configuration described above, when the IG-ON/OFF switch 70 is turned off, the engine is stopped securely and then the ECU main relay 46 is turned off, and when the IG-ON/OFF switch 70 is turned on next time, an opportunity for detecting an abnormality in the atmospheric pressure sensor 22 can be obtained. This will be described below with reference to FIGS. 2 to 5.

Figure 2:
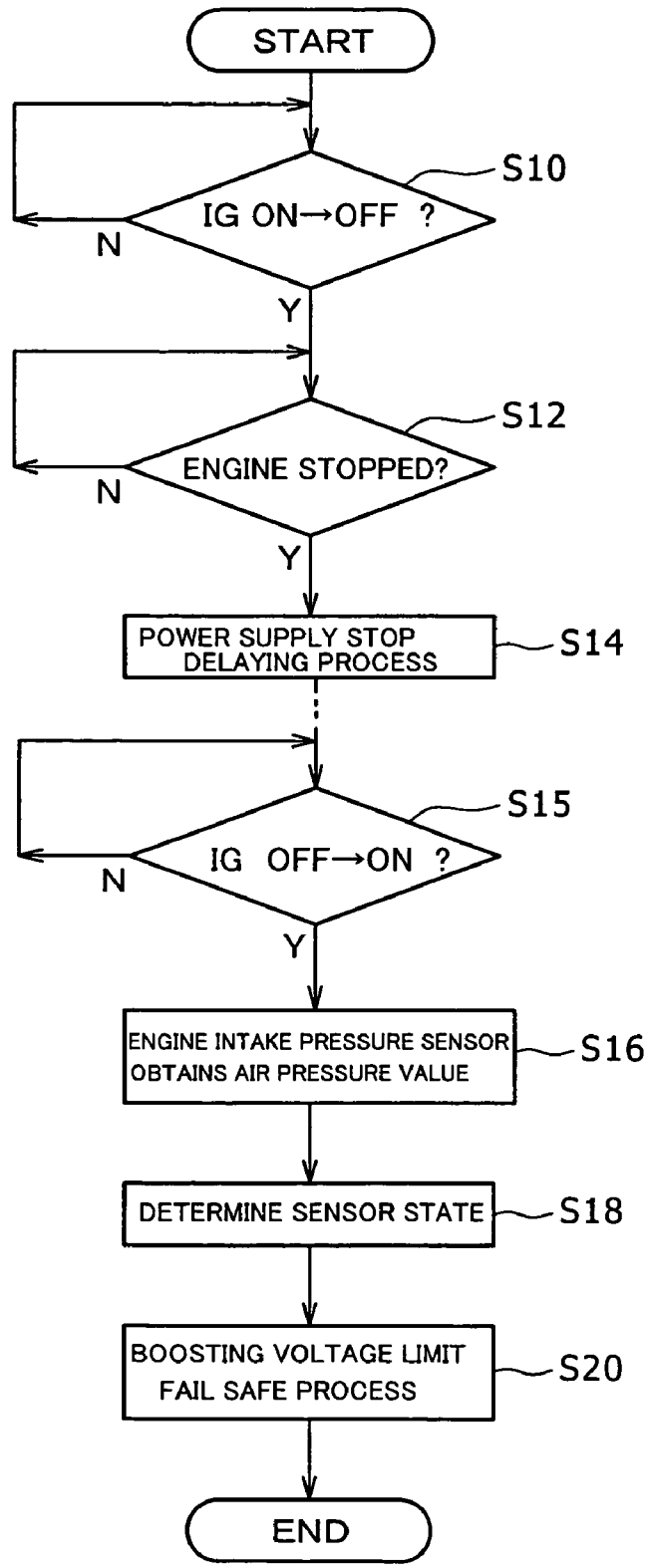
FIG. 2 is a flowchart illustrating the procedures for abnormality diagnosis of an atmospheric pressure sensor in the embodiment of the present invention.
Figure 3:
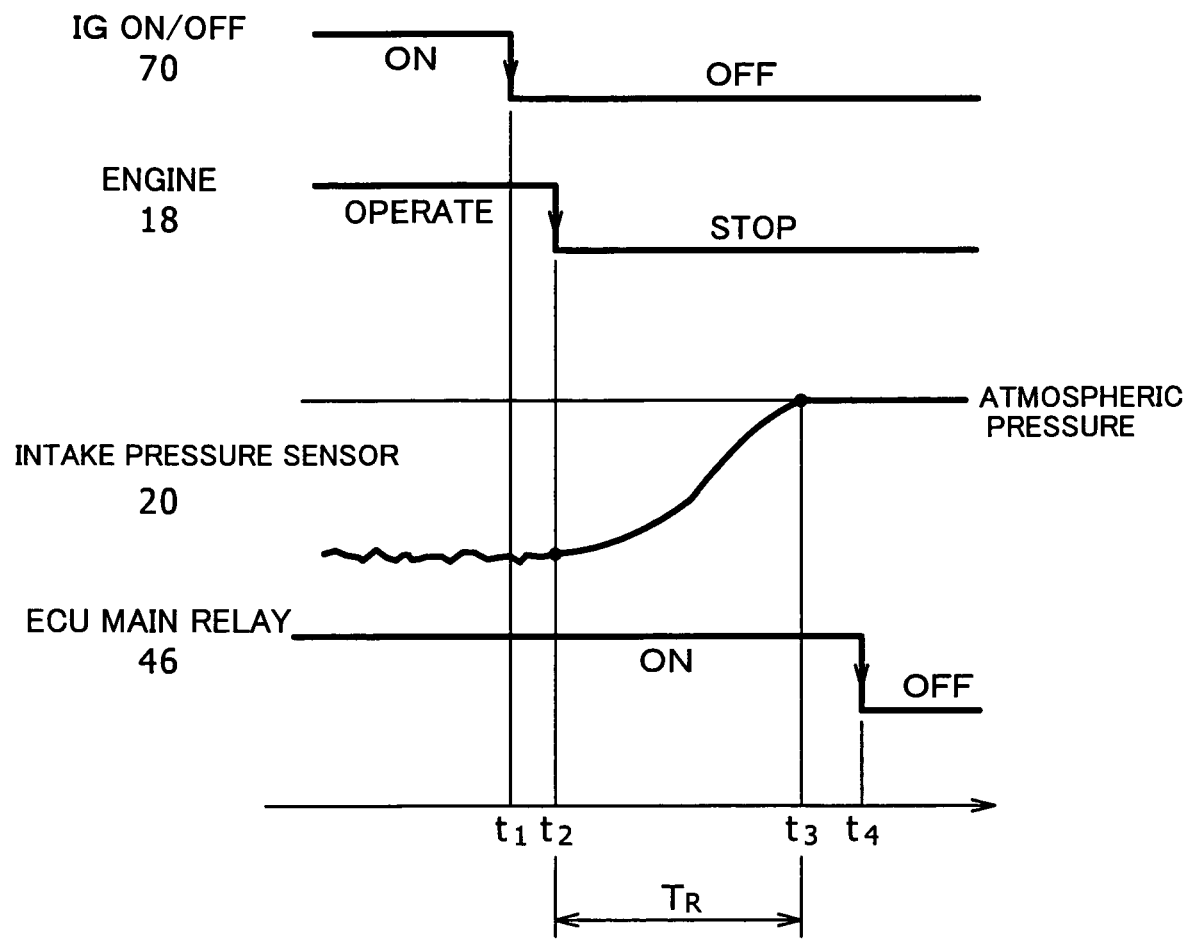
FIG. 3 is a timing chart illustrating state changes of respective elements when an IG-ON/OFF switch is turned off in the embodiment of the present invention.
Figure 4:
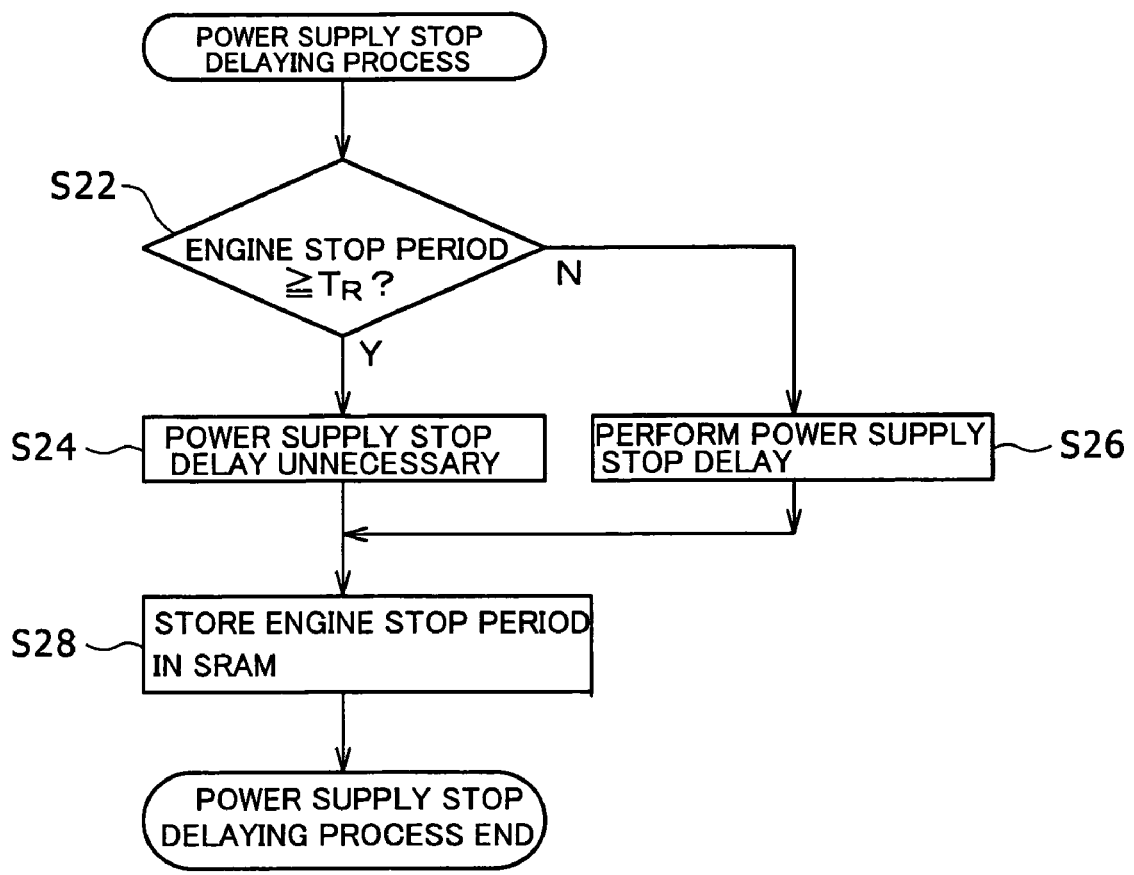
FIG. 4 is a flowchart illustrating the internal procedures of a power supply stop delaying process in the flowchart of FIG. 2 in the embodiment of the present invention.
Figure 5:
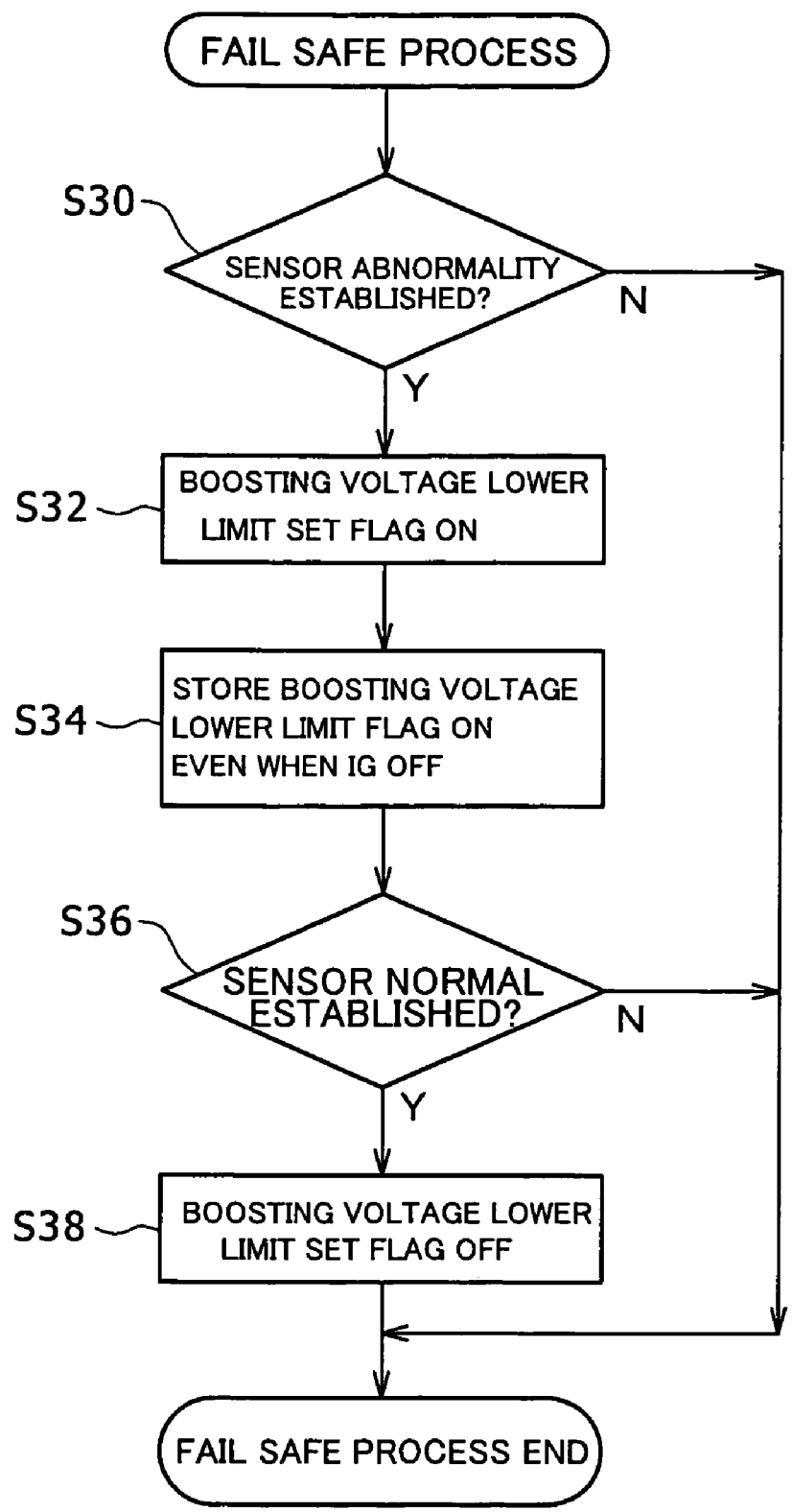
FIG. 5 is a flowchart illustrating the internal procedures of a boosting voltage control fail safe process in the flowchart of FIG. 2 in the embodiment of the present invention.

FIG. 2 is a flowchart showing the procedures relating to an abnormality diagnosis of the atmospheric pressure sensor 22. FIG. 3 is a timing chart illustrating state changes of the respective elements when the IG-ON/OFF switch 70 is turned off. FIG. 4 is a flowchart illustrating the internal procedures of a power supply stop delaying process in the flowchart of FIG. 2. FIG. 5 is a flowchart illustrating the internal procedures of a boosting voltage limit fail safe process in the flowchart of FIG. 2. The procedures of these flowcharts correspond to the respective procedures of the atmospheric pressure sensor abnormality diagnosis program in the vehicle control program.

As mentioned above, FIG. 2 shows the procedures relating to an abnormality diagnosis of the atmospheric pressure sensor 22. The procedures relating to an abnormality diagnosis of the atmospheric pressure sensor 22 include a narrow abnormality diagnosis for determining whether a state of the atmospheric pressure sensor 22 is normal or abnormal, and a broad abnormality diagnosis for limiting the boosting voltage of the voltage converter 34 of the power supply circuit 18 to the safe side when the atmospheric pressure sensor 22 may be abnormal.

In FIG. 2, it is assumed that the initial state of the IG-ON/OFF switch 70 of the vehicle is an ON state. In this state, the entire system of the vehicle is operating and the state of the IG-ON/OFF switch 70 is monitored. First, it is determined whether the state of the IG-ON/OFF switch is changed from ON to OFF (S10). Specifically, the control section 50 acquires a signal showing the state of the IG-ON/OFF switch 70, and determines whether the state of the IG-ON/OFF switch is changed from ON to OFF.

When the determination at step S10 is positive, an operation stop command is output to the entire system of the vehicle. This step is carried out by the function of the system start/stop module 52 of the control unit 50. Specifically, for example, when the engine 12 is operating, a command to stop the operation of the engine 12 is transmitted to the engine ECU not shown, and when the rotating electric machines 14 and 16 are operating, a command to stop the operation of the rotating electric machines 14 and 16 is transmitted to the MG-ECU not shown. Further, a command to stop power supply to the various ECUs is also transmitted to the ECU main relay 46.

Next, it is determined whether the engine has stopped 12 (S12). For example, it is determined whether the number of rotations of the engine 12 becomes zero. When the determination at step S12 is positive, a power supply stop delaying process is performed (S14). The power supply stop delaying process is a process to delay transition to an OFF state of the ECU main relay 46 for some time. In other words, even when a command to stop power supply to the various ECUs is transmitted to the ECU main relay 46 at step 10, the state of the ECU main relay 46 is not changed until the determination at step S12 becomes positive.

The concept of the power supply stop delaying process will be described using FIG. 3. FIG. 3 shows changes in the states of respective elements when the IG-ON/OFF switch 70 is turned off. In FIG. 3, the horizontal axis indicates time, and the vertical axis shows respective changes in the states of the IG-ON/OFF switch 70, the engine 12, the intake pressure sensor 20, and the ECU main relay 46, in this order from the top to bottom of the drawing sheet.

In FIG. 3, it is shown that the IG-ON/OFF switch 70 is changed from ON to OFF at time $t_1$, and at time $t_2$ when an engine stop command transmission time and an engine stop processing time and the like have elapsed, the state of the engine 12 is changed from an operating state to a stopped state.

After the engine 12 stops, a detection value of the intake pressure sensor 20 detecting the pressure of the intake pipe of the engine 12 rises from the intake pressure at the time when the engine 12 was operating to the atmospheric pressure, and then the pressure of the intake pipe returns to the atmospheric pressure at time $t_3$. A difference between the time t2 when the engine 12 stops and the time t3 when the pressure of the intake pipe returns to the atmospheric pressure, that is, $T_R = t_3 - t_2$, is an atmospheric pressure return period, and as the value is determined by the structure and the like of the engine 12, it can be acquired beforehand through experiments or the like. For instance, it can be set that $T_R = 5000$ ms. The value of the atmospheric pressure return period, acquired through experiments or the like, is stored as an atmospheric pressure return period storage file 62 in the storage unit 60.

In the ECU main relay 46, although an operation stop command is transmitted to the ECU main relay 46 at the time t1 when the IG-ON/OFF switch 70 is changed from ON to OFF, the state thereof is switched from an ON state to an OFF state at a time t4 which is after the time t3 when the detection value of the intake pressure sensor 20 returned to the atmospheric pressure. Namely, in the ECU main relay 46, an actual power supply stopping process is delayed from the time t1 when the operation stop command is output until the time when at least the atmospheric pressure return period TR has elapsed. This delaying process is the power supply stop delaying process at step S14 in FIG. 2.

In this way, by performing the power supply stop delaying process when the IG-ON/OFF switch 70 is OFF, it is possible to secure a time period during which the air pressure of the intake pressure sensor 20 returns to the atmospheric pressure. Thereby, when the IG-ON/OFF switch 70 is changed from OFF to ON next, it is possible to immediately acquire the detection value of the intake pressure sensor 20, and based on the result, to rapidly diagnose whether the states of the atmospheric pressure sensor 22 and the intake pressure sensor 20 are normal or abnormal. Accordingly, an opportunity for diagnosing abnormalities in the atmospheric pressure sensor 22 and the intake pressure sensor 20 is provided immediately when the state of the IG-ON/OFF switch 70 is next changed from OFF to ON.

FIG. 4 is a flowchart showing the internal procedures of the power supply stop delaying process at step S14 in FIG. 2. The respective procedures below are performed by the functions of the power supply stop delaying module 58 of the control unit 50.

After it is determined that the engine 12 has stopped at step S12 in FIG. 2, it is determined whether the engine stop period becomes the atmospheric pressure return period $T_R$ or longer (S22). The engine stop period can be acquired using a timer or the like which starts at the time t2 when the engine 12 has stopped which is described in FIG. 3. For example, with use of a timer or a counter inside the control unit 50, the engine stop period can be acquired by starting the timer or the counter when the engine 12 stops. Further, the atmospheric pressure return period $T_R$ of the intake pressure sensor 20 can be acquired by reading the atmospheric pressure return period storing file 62 in the storage unit 60.

It should be noted that in the case of a system having a soak timer to be used as a timer capable of measuring a period of time from an OFF state to the next ON state of the IG-ON/OFF switch 70, or a system in which a navigation system has a timer capable of measuring a period of time from an OFF state to the next ON state of the IG-ON/OFF switch 70, the power supply stop delaying process may not be performed. In those cases, whether the engine stop period becomes the atmospheric pressure return period $T_R$ or longer may be determined after it is determined that the engine 12 has stopped with use of these timers.

At Step S22, determination may be performed by comparing the engine stop period acquired in this manner and the atmospheric pressure return period $T_R$. In the above example, as TR=5000 ms, it is determined whether or not the engine stop period is 5000 ms or longer.

When the determination at step S22 is positive, the power supply stop delaying process is not required (S24). When the determination at step S22 is negative, the power supply stop delaying process is performed (S26). In that case, as described in FIG. 3, the ECU main relay 46 is not turned off until the atmospheric pressure return period TR has elapsed from the time t2 when the engine 12 has stopped, and during the period, electric power is continuously supplied from the low-voltage battery 44 to the control unit 50.

When the processes of steps S24 and S26 have been performed, the engine stop period, which is a period of time during which the engine 12 has stopped, is stored in the storage unit 60. The stored engine stop period is read when the state of the IG-ON/OFF switch is changed from OFF to ON next time, and is used to determine, for when the state of the IG-ON/OFF switch 70 was OFF previously, how long the engine stop period had been secured before the ECU main relay 46 was turned off, how long an additional time is necessary for the engine stop period to detect an abnormality in the atmospheric pressure sensor 22, and the like.

In this way, the ECU main relay 46 is not turned off until the atmospheric pressure return period TR has elapsed after the engine stopped, and when it is interrupted for some reason, the engine stop period, which is the actual period of time measured from when the engine has stopped, is stored.

Turning back to FIG. 2, next, it is determined whether the state of the IG-ON/OFF switch 70 is changed from OFF to ON (S15). The determination becomes positive when, at step S10, after the state of the IG-ON/OFF switch 70 was changed from ON to OFF, the IG-ON/OFF switch 70 is again changed from OFF to ON.

When the determination at step S15 is positive, a process of acquiring an air pressure value detected by the intake pressure sensor 20 of the engine 12 is performed (S16). If, at step S14, the process of not turning off the ECU main relay 46 until the atmospheric pressure return period $T_R$ has elapsed, was performed completely, the control unit 50 acquires an air pressure value detected by the intake pressure sensor 20.

Generally, a period from the time that the IG-ON/OFF switch 70 was turned off and the engine 12 stopped last time until the time that the IG-ON/OFF switch 70 is turned on this time is sufficiently longer than 5000 ms. Accordingly, the period from the previous system stop command until the present system start command and the atmospheric pressure return period $T_R$ are compared, and when the former is longer than the latter, a diagnosis regarding abnormalities in the atmospheric pressure sensor 22 and the intake pressure sensor 20 of the engine 12 can be performed immediately after the present system start.

However, there are unordinary cases sometimes, including, a case where the IG-ON/OFF switch 70 is turned off and, immediately afterwards, turned on by a user, a case where the entire system must be restarted for convenience of vehicle travel, and a case where a user is aware of an operational error, for example. In such cases, as starting of the entire system is given priority, when the IG-ON/OFF switch 70 is changed from OFF to ON this time, the engine stop period including the previous engine stop period may become less than the atmospheric pressure return period $T_R$.

For instance, when the IG-ON/OFF switch 70 is changed from OFF to ON this time, there is a case where the engine stop period including the previous engine stop period is only 2000 ms. As the previous engine stop period is stored in the storage unit 60 as described above relating to step S28 of FIG. 4, it can be read out and used. Thereat, with use of the stored content in the storage unit 60, the shortage of the engine stop period is adapted to be compensated when the IG-ON/OFF switch is turned on next time, that is, after step S15. In that case, at step S16, after the IG-ON/OFF switch 70 is turned on, air pressure detected by the intake pressure sensor 20 is acquired when the atmospheric pressure return period $T_R$ has elapsed after waiting for a time lacking in the engine stop period.

In this case, air pressure detected by the intake pressure sensor 20 is obtained when the total engine stop period reaches the atmospheric pressure return period $T_R$, after waiting for a period of time to compensate for the shortage in the engine stop period for the atmospheric pressure return period $T_R$ while stopping the engine 12. In the above example, the shortage in the engine stop period is 5000 ms−2000 ms=3000 ms. Thus, when the IG-ON/OFF switch 70 is changed from OFF to ON next time, the engine 12 is not started for 3000 ms, and when the total engine stop period reaches 5000 ms, the air pressure value detected by the intake pressure sensor 20 is obtained. In this way, even if the engine stop period was short when the IG-ON/OFF switch 70 was previously turned off and the IG-ON/OFF switch 70 was changed from OFF to ON immediately afterwards, the next step, which is an abnormality diagnosis of the sensors, can be performed with the shortest waiting time using the stored content in the storage unit 60.

In the case where the IG-ON/OFF switch 70 is turned off and turned on immediately afterwards by a user as described above, an abnormality diagnosis of the atmospheric pressure sensor 22 and the intake pressure sensor 20 may not be performed. In that case, although an opportunity for an abnormality diagnosis of the atmospheric pressure sensor 22 and the intake pressure sensor 20 is not provided at this point, an opportunity may be provided afterwards. Therefore, an unnecessary engine stopping process can be prevented by not performing a diagnosis of abnormalities on the atmospheric pressure sensor 22 and the intake pressure sensor 20.

If the IG-ON/OFF switch 70 is turned off and then turned on immediately afterwards by a user, determination can be simply performed as described below. When the IG-ON/OFF switch 70 is turned off and then turned on immediately afterwards by a user, an air pressure value detected by the intake pressure sensor 20 of the engine 12 drops from a state where the air pressure has not been raised much from the intake pressure which is negative pressure when the engine 12 operates.

Thus, when time change of the air pressure value detected by the intake pressure sensor 20 is larger than a predetermined rate of change immediately after the IG-ON/OFF switch 70 is turned on, that is, immediately after the system start command, it is considered that the IG-ON/OFF switch 70 is turned on this time, which means a system start command is output, following the state where the IG-ON/OFF switch 70 was OFF. Accordingly, in such case, there is no need to perform a diagnosis of abnormalities on the atmospheric pressure sensor 22 and the intake pressure sensor 20 as described above.

Turning back to the description of FIG. 2 again, when the air pressure of the intake pressure sensor 20 is acquired at step S16, the acquired air pressure value of the intake pressure sensor 20 and an air pressure value detected by the atmospheric pressure sensor 22 are compared, and it is determined from the sensor state whether there is a sensor abnormality (s18). This step is performed by the function of the sensor state determination module 54 of the control unit 50.

Specifically, when a first predetermined period has elapsed from the previous engine stop, if a state where a deviation between the air pressure value detected by the atmospheric pressure sensor 22 and the air pressure value detected by the intake pressure sensor 20 is larger than a predetermined deviation continues for a second predetermined period, it can be diagnosed that the atmospheric pressure sensor 22 or the intake pressure sensor 20 is abnormal. As the first predetermined period, the atmospheric pressure return period $T_R$ of the intake pressure sensor 20 may be used. With this configuration, when the intake pressure sensor 20 is normal, the air pressure value detected by the intake pressure sensor 20 is equal to the atmospheric pressure. As the second predetermined period, any period of time sufficient for eliminating measurement errors may be used. For example, the second predetermined period may be about 1000 ms. As a predetermined deviation, a pressure difference which is sufficiently larger than measurement errors may be used.

As $T_R$=5000 ms in the above example, when a state, where a deviation which is an air pressure difference between the air pressure value detected by the atmospheric pressure sensor 22 and the air pressure value detected by the intake pressure sensor 20 is large enough exceeding measurement errors, continues for 1000 ms, if the intake pressure sensor 20 is normal, the atmospheric pressure sensor 22 is abnormal, and if the atmospheric pressure sensor 22 is normal, the intake pressure sensor 20 is abnormal. In this way, it is possible to determine whether the atmospheric pressure sensor 22 and the intake pressure sensor 22 are normal or abnormal based on a deviation between the air pressure value detected by the atmospheric pressure sensor 22 and the air pressure value detected by the intake pressure sensor 22.

When the sensor state is determined at step S18, a fail safe process to limit the boosting voltage of the voltage converter 34 of the power supply circuit 18 to the safe side is then performed (S20). A fail safe process is a process to set the boosting voltage to the safe side so as to prevent the insulating properties of the rotating electric machines 14 and 16 and the power supply circuit 18 from deteriorating even when the atmospheric pressure drops, because an appropriate boosting voltage cannot be set when the sensor is abnormal. Specifically, the boosting voltage of the voltage converter 34 is set to a predetermined lower limit voltage which has been set considering travel and the like of the vehicle. Then, when it is determined that the sensor is not abnormal, the process is back to the normal procedure, and the boosting voltage of the voltage converter 34 is set corresponding to the air pressure value detected by the atmospheric pressure sensor 22. With the process at step S20, the abnormality diagnosing process regarding the sensor state has completed, and the process returns to the initial state, which is step S10 for example.

FIG. 5 is a flowchart showing the internal procedures of the fail safe process at step S20 in FIG. 2. The respective procedures below are performed by the function of the boosting limit module 56 of the control unit 50.

First, it is determined whether a sensor abnormality is decided (S30). Specifically, the determination at step S18 in FIG. 2 is confirmed. When the determination at step S30 is positive, the boosting voltage is set to the lower limit voltage, and a flag indicating that this has been done is set to ON (S32). Then, the fact that the flag is ON is stored in the storage unit 60 (S34). Specifically, the fact that the flag is ON is stored in the sensor abnormal state storing file 64 of the storage unit 60. This stored content is maintained until the determination at the next step S36 becomes positive even in a state where the IG-ON/OFF switch is OFF.

After the process at step S34 ends, it is determined whether the determination that the sensor is normal has been established (S36). This determination, that is, whether the determination that the sensor is normal has been established, is performed when another opportunity for determination at step S18 in FIG. 2 occurs. When it is determined that normal determination of the sensor has been established at step S36, the process returns to the normal procedures, and the boosting voltage of the voltage converter 34 is set corresponding to the air pressure value detected by the atmospheric pressure sensor 22. Then, the flag indicating that the boosting voltage is set to the lower limit voltage is changed from ON to OFF (S38).

According to the above fail safe process, once an abnormality determination of the sensor is established and the boosting voltage is set to the lower limit voltage, the boosting voltage remains at the lower limit voltage until a normal determination of the sensor is established. Accordingly, as the boosting voltage remains at the lower limit voltage until the atmospheric pressure sensor 22 is reliably determined to be normal, even when the atmospheric pressure drops, deterioration of the insulating properties of the rotating electric machines 14 and 16 and the power supply circuit 18 can be prevented. In this way, the fail safe process is performed reliably.

As described above, by appropriately performing the engine stop process and the like even when the IG-ON/OFF switch 70 is changed from OFF to ON, an opportunity for abnormality diagnosis of the atmospheric pressure sensor 22 and the intake pressure sensor 20 can be appropriately provided. Further, even when the IG-ON/OFF switch 70 is changed from OFF to ON, as the fail safe process previously set remains until the sensor is reliably determined to be normal, advantages of the fail safe process can be reliably maintained.

Although the present invention has been fully described by way of examples with reference to the accompanying drawings, it is to be noted that various changes and modifications will be apparent to those skilled in the art. Therefore, unless such changes and modifications depart from the spirit and the scope of the present invention, they should be construed as being included therein.

What is claimed is:

1. A vehicle control system comprising:
a boosting circuit that supplies a boosting voltage to a rotating electric machine;
a boosting voltage setting unit that sets a value of the boosting voltage of the boosting circuit according to a detection result of an atmospheric pressure sensor;
an abnormality diagnosis unit that performs a diagnosis of an abnormality on the atmospheric pressure sensor or an engine intake pressure sensor, based on a comparison between a value detected by the engine intake pressure sensor and a value detected by the atmospheric pressure sensor when an engine has stopped;
a circuit unit power supply that supplies operational electric power to the abnormality diagnosis unit; and
a power supply stop delaying unit that delays a stop of the circuit unit power supply until an atmospheric pressure return period, during which an air pressure detected by the engine intake pressure sensor returns to an atmospheric pressure, has elapsed,
wherein when a time change of an air pressure value, detected by the engine intake pressure sensor immediately after the system start command, is larger than a predetermined rate of change, the abnormality diagnosis unit determines that it is not necessary to perform a diagnosis of an abnormality on the atmospheric pressure sensor and the engine intake pressure sensor, based on an assumption that the present system start command was output following the previous system stop command, and otherwise the abnormality diagnosis unit permits the diagnosis of an abnormality on the atmospheric pressure sensor and the engine intake pressure sensor.

2. The vehicle control system according to claim 1, wherein the abnormality diagnosis unit immediately performs a diagnosis of an abnormality on the atmospheric pressure sensor or the engine intake pressure sensor when the operational electric power is again supplied from the circuit unit power supply after a stop of the circuit unit power supply has been delayed until the atmospheric pressure return period has elapsed.

3. The vehicle control system according to claim 1, wherein the boosting voltage setting unit sets a value of the boosting voltage of the boosting circuit based on a result of an abnormality diagnosis.

4. The vehicle control system according to claim 3, wherein the boosting voltage setting unit sets a value of the boosting voltage of the boosting circuit to a safe side when the atmospheric pressure sensor or the engine intake pressure sensor is diagnosed as abnormal based on a result of the abnormality diagnosis, and the set value remains until the atmospheric pressure sensor or the engine intake pressure sensor is diagnosed as normal based on a result of a next abnormality diagnosis.

5. The vehicle control system according to claim 4, further comprising:
an abnormality storing unit that stores a sensor abnormality when the atmospheric pressure sensor or the engine intake pressure sensor was diagnosed as abnormal at the time of previous system stop and the boosting voltage was set to a predetermined lower limit voltage,
wherein when the abnormality storing unit stores a sensor abnormality, the abnormality diagnosis unit causes the boosting voltage setting unit to maintain the boosting voltage at the predetermined lower limit voltage at the time of present system start.

6. The vehicle control system according to claim 3, wherein when the abnormality diagnosis unit diagnoses that the atmospheric pressure sensor or the engine intake pressure sensor is abnormal, the abnormality diagnosis unit causes the boosting voltage setting unit to set the boosting voltage to a predetermined lower limit voltage.

7. The vehicle control system according to claim 1, further comprising:
a start-stop unit that commands a start and a stop of the entire system including the engine and the rotating electric machine; and
a return period storing unit that stores the atmospheric pressure return period beforehand as a characteristic relating to the engine intake pressure sensor,
wherein the abnormality diagnosis unit compares a period of time from a previous system stop command until a present system start command and the atmospheric pressure return period, and when the period of time from the previous system stop command until the present system start command is longer than the atmospheric pressure return period, the abnormality diagnosis unit performs a diagnosis of an abnormality on the atmospheric pressure sensor and the engine intake pressure sensor immediately after the present system start.

8. The vehicle control system according to claim 1, wherein when a next system start command is output during the time that a stop of the circuit unit power supply has been delayed, a system starting process, including a determination of whether to start the engine, is given priority.

9. The vehicle control system according to claim 1, wherein the abnormality diagnosis unit diagnoses that the atmospheric pressure sensor or the engine intake pressure sensor is abnormal when a state, where a deviation between an air pressure value detected by the atmospheric pressure sensor and an air pressure value detected by the engine intake pressure sensor is larger than a predetermined deviation, continues for a second predetermined period after a first predetermined period has elapsed from the time when the engine stopped.

* * * * *